(12) United States Patent
Ichii

(10) Patent No.: US 7,956,884 B2
(45) Date of Patent: Jun. 7, 2011

(54) OPTICAL SCANNING DEVICE AND IMAGE FORMING APPARATUS

(75) Inventor: Daisuke Ichii, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 43 days.

(21) Appl. No.: 12/472,818

(22) Filed: May 27, 2009

(65) Prior Publication Data

US 2009/0295900 A1    Dec. 3, 2009

(30) Foreign Application Priority Data

Jun. 3, 2008    (JP) ................................. 2008-146214

(51) Int. Cl.
 B41J 15/14    (2006.01)
 B41J 27/00    (2006.01)
(52) U.S. Cl. ........................................ 347/241; 347/256
(58) Field of Classification Search .................. 347/232, 347/233, 238, 241, 244, 256, 258, 129, 131, 347/134, 236, 237, 246, 247

See application file for complete search history.

(56) References Cited

U.S. PATENT DOCUMENTS

| | | | | |
|---|---|---|---|---|
| 4,372,644 | A | * | 2/1983 | Unger .............................. 385/27 |
| 7,218,432 | B2 | | 5/2007 | Ichii et al. |
| 7,417,777 | B2 | | 8/2008 | Saisho et al. |
| 7,443,558 | B2 | | 10/2008 | Sakai et al. |
| 2007/0211325 | A1 | | 9/2007 | Ichii |
| 2007/0253047 | A1 | | 11/2007 | Ichii et al. |
| 2007/0253048 | A1 | | 11/2007 | Sakai et al. |
| 2008/0024849 | A1 | | 1/2008 | Hayashi et al. |
| 2008/0025759 | A1 | | 1/2008 | Ichii et al. |
| 2008/0055672 | A1 | | 3/2008 | Watanabe et al. |
| 2008/0068690 | A1 | | 3/2008 | Ichii |
| 2008/0068693 | A1 | | 3/2008 | Hayashi et al. |
| 2008/0100895 | A1 | | 5/2008 | Hayashi et al. |
| 2008/0123159 | A1 | | 5/2008 | Hayashi et al. |
| 2008/0192319 | A1 | | 8/2008 | Miyatake et al. |
| 2008/0204842 | A1 | | 8/2008 | Arai et al. |
| 2008/0212999 | A1 | | 9/2008 | Masuda et al. |
| 2008/0247021 | A1 | | 10/2008 | Ichii |

(Continued)

FOREIGN PATENT DOCUMENTS

JP    11-242175    9/1999

(Continued)

OTHER PUBLICATIONS

U.S. Appl. No. 11/993,406, filed Apr. 27, 2007.

*Primary Examiner* — Hai C Pham

(74) *Attorney, Agent, or Firm* — Oblon, Spivak, McClelland, Maier & Neustadt, L.L.P.

(57) ABSTRACT

In an optical scanning device employing a multi-beam scanning method, a surface emitting laser light source includes laser emission sources; a parallel-plate-like quarter wavelength plate is arranged between the surface emitting laser light source and a first optical system; a light-intensity detecting unit separates light intensity of the laser beams of which form is converted by the first optical system and detects separated laser beams; and a light-intensity adjusting unit adjusts emission intensity of the laser emission sources individually based on a detection result by the light-intensity detecting unit. The quarter wavelength plate is arranged so that an optical axis thereof is tilted ±45 degrees with respect to the main-scanning direction around an optical axis of the first optical system.

7 Claims, 3 Drawing Sheets

U.S. PATENT DOCUMENTS

| | | |
|---|---|---|
| 2008/0266633 A1 | 10/2008 | Hirakawa et al. |
| 2008/0267663 A1 | 10/2008 | Ichii et al. |
| 2009/0002792 A1 | 1/2009 | Sakai et al. |
| 2009/0060582 A1 | 3/2009 | Ichii et al. |
| 2009/0065685 A1 | 3/2009 | Watanabe et al. |

FOREIGN PATENT DOCUMENTS

| | | |
|---|---|---|
| JP | 2000195091 A * | 7/2000 |
| JP | 3243013 | 10/2001 |
| JP | 2005-156933 | 6/2005 |

* cited by examiner

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2008-146214 filed in Japan on Jun. 3, 2008.

BACKGROUND OF THE INVENTION

1. Field of the Invention

The present invention relates to an optical scanning device and an image forming apparatus.

2. Description of the Related Art

Image formation by optical scanning is widely implemented in various image forming apparatuses such as a digital copier and a laser printer. As an optical scanning method for enabling a high-speed image formation by optical scanning, a multi-beam scanning method is known, and as a laser light source appropriate for this scanning method, recently, a vertical-cavity surface-emitting laser (VCSEL) has been attempted for use.

In an edge emitting semiconductor laser array that has been conventionally known as a laser light source for the multi-beam scanning method and a beam combination by using a plurality of edge emitting semiconductor lasers and a beam combining prism, the number of laser emission sources that can be simultaneously used is limited to a small number.

On the other hand, the VCSEL can array tens to hundreds laser emission sources within the same surface from which a plurality of laser beams is emitted, thereby enabling to perform the optical scanning on tens to hundreds scanning lines at the same time, enabling to fully utilize an advantage of multi-beam scanning, i.e., high-speed image formation.

However, when the VCSEL is used as a laser light source, the following problems occur.

That is, although the laser beam emitted from the VCSEL is linearly polarized light beam, when a plurality of laser emission sources is allocated in the same VCSEL, it is difficult to align the polarization direction of the laser beam emitted from each laser emission source. Therefore, it is difficult to obtain a plurality of laser beams with the same polarization direction.

In addition, it is known that the polarization direction of the laser beam emitted from the VCSEL changes with the passage of time; therefore, even if a plurality of laser beams with the same polarization direction can be realized, the polarization direction of each laser beam may vary with the passage of time.

As is commonly known, reflectance of light in a linearly polarized state greatly changes depending on a reflection angle. For this reason, with the change of incident angle onto the deflection reflection surface of a polygon mirror that deflects the laser beam, an incident angle onto the lens face of an fθ lens, and other factors, the amount of the laser beam that reaches a scanning surface changes. Correction of such change of the amount of laser beam that reaches the scanning surface has been conventionally known as shading correction.

Because the change of the reflectance of light in a linearly polarized state by reflection angle differs between P polarization component and S polarization component, as a conventionally known shading correction, it is known that the laser beam emitted from the laser source is changed to circularly polarized light or elliptically polarized light before the laser beam enters the deflection reflection surface.

In addition, unlike the edge emitting semiconductor laser, in the VCSEL, the laser beam is emitted only from the light emitting surface thereof. For this reason, in order to control the light intensity, it is necessary to separate a part of emitted laser beam, guides it in a sensor for controlling the light intensity, and control the light intensity in accordance with the output of the sensor.

Because a semitransparent mirror is generally used for separating the laser beam, if the reflectance in the semitransparent mirror changes due to the change of the polarization direction, there is a possibility that control of the light intensity may be performed in accordance with the change of the reflectance thereof, thereby causing also an error in the shading correction.

An optical scanning device that is studied in view of such points and an apparatus described in Japanese Patent Application Laid-open No. 2005-156933 are known.

SUMMARY OF THE INVENTION

It is an object of the present invention to at least partially solve the problems in the conventional technology.

According to an aspect of the present invention, there is provided an optical scanning device that employs a multi-beam scanning method. The optical scanning device includes a surface emitting laser light source that includes a plurality of laser emission sources; a first optical system that converts a form of laser beams in a linearly polarized state that are emitted from the laser emission sources into a form appropriate for a subsequent optical system; a deflection unit that includes a deflection reflection surface and deflects the laser beams of which form is converted by the first optical system by reflecting the laser beams by the deflection reflection surface; a second optical system that focuses the laser beams of which form is converted by the first optical system as line images that and are separated from one another in an sub-scanning direction are long in a main-scanning direction near the deflection reflection surface; a third optical system that focuses the laser beams deflected by the deflection unit on a scanning surface as a plurality of light spots that are separated one another in the sub-scanning direction; a parallel-plate-like quarter wavelength plate that is arranged between the surface emitting laser light source and the first optical system; a light-intensity detecting unit that separates light intensity of the laser beams of which form is converted by the first optical system and detects separated laser beams as light-intensity detection light beams; and a light-intensity adjusting unit that adjusts emission intensity of the laser emission sources individually based on a result of detection by the light-intensity detecting unit. The quarter wavelength plate is arranged so that an optical axis of the quarter wavelength plate is tilted ±45 degrees with respect to the main-scanning direction around an optical axis of the first optical system.

According to another aspect of the present invention, there is provided an image forming apparatus that forms an electrostatic latent image by writing image data on a photosensitive element by optical scanning and visualizes the electrostatic latent image as a toner image. The image forming apparatus includes an optical scanning device that employs a multi-beam scanning method and includes a surface emitting laser light source that includes a plurality of laser emission sources; a first optical system that converts a form of laser beams in a linearly polarized state that are emitted from the laser emission sources into a form appropriate for a subsequent optical system; a deflection unit that includes a deflection reflection surface and deflects the laser beams of which form is converted by the first optical system by reflecting the laser beams by the deflection reflection surface; a second optical system that focuses the laser beams of which form is converted by the first optical system as line images that and are separated from one another in an sub-scanning direction are long in a main-scanning direction near the deflection reflection surface; a third optical system that focuses the laser beams deflected by the deflection unit on a scanning surface as a plurality of light spots that are separated one another in the sub-scanning direction; a parallel-plate-like quarter wavelength plate that is arranged between the surface emitting laser light source and the first optical system; a light-intensity detecting unit that separates light intensity of the laser beams of which form is converted by the first optical system and detects separated laser beams as light-intensity detection light beams; and a light-intensity adjusting unit that adjusts emission intensity of the laser emission sources individually based on a result of detection by the light-intensity detecting unit. The quarter wavelength plate is arranged so that an optical axis of the quarter wavelength plate is tilted ±45 degrees with respect to the main-scanning direction around an optical axis of the first optical system.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1A:
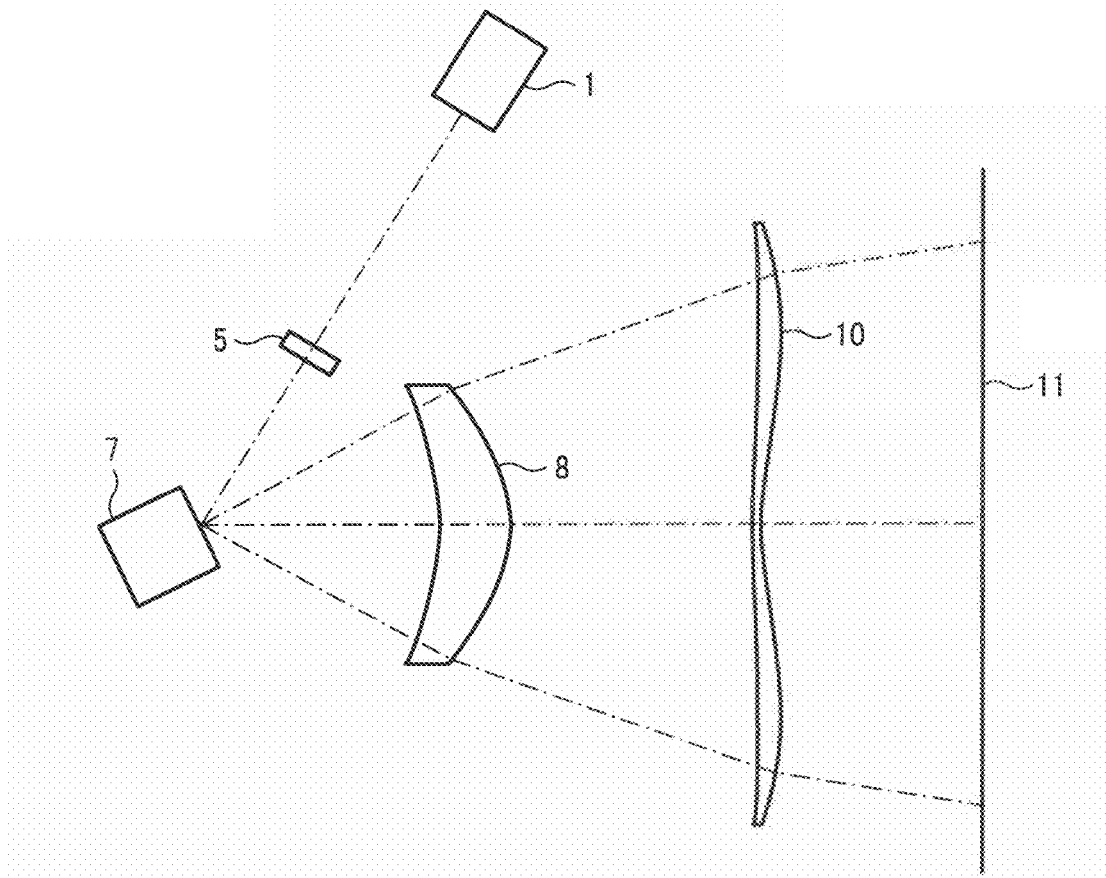
FIG. 1A is a plan view for explaining an example of an optical arrangement of an optical scanning device according to an embodiment of the present invention.
Figure 1B:
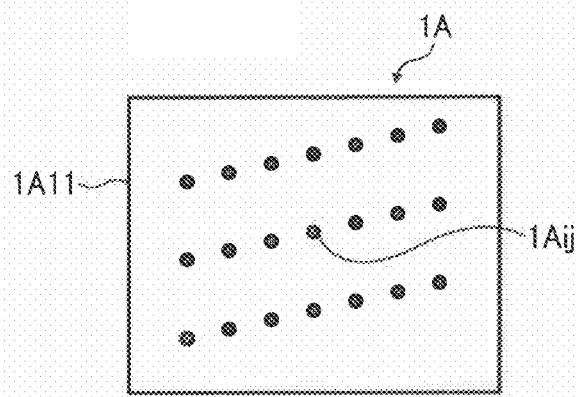
FIG. 1B is a schematic diagram for explaining a VCSEL of a light source unit of the optical scanning device.

FIGS. 1A and 1B are diagrams illustrating an example of an optical arrangement of an optical scanning device, in which FIG. 1A is a plan view illustrating an optical system forming an optical path from a light source unit 1 to a scanning surface 11.

The light source unit 1 includes a vertical-cavity surface-emitting laser (VCSEL), a first optical system, a quarter wavelength plate, a light-intensity detecting unit, the light-intensity adjusting unit, and an aperture for beam shaping; and these units are incorporated in respective predetermined positions in a casing to be a unit.

FIG. 1B is a schematic diagram for explaining a VCSEL 1A. As shown in FIG. 1B, a plurality of laser emission sources 1A11, ... 1Aij, ... is arrayed on the light emitting surface of the VCSEL 1A, and diverging laser beam is emitted from each laser emission source 1Aij (i and j are integers). The VCSEL 1A includes a drive circuit (not shown) for driving each laser emission source 1Aij.

Therefore, from the light source unit 1, a plurality of laser beams from the VCSEL 1A passes through the quarter wavelength plate to make the ratio of the P polarization component and the S polarization component be 1:1, is converted into appropriate light beam forms by the first optical system, and is emitted as laser beams of which light intensity is separated by the light-intensity detecting unit after beam shaping is performed.

Furthermore, in accordance with the light intensity detected by the light-intensity detecting unit, the light intensity of each laser emission source 1Aij of the VCSEL 1A is properly controlled by the light-intensity adjusting unit.

More specifically, it is assumed that the function of the first optical system be a collimation function. Therefore, any of a plurality of laser beams emitted from the light source unit 1 is a parallel light beam. In addition, although the laser beams cross with each other at the position of an image side focal plane of the first optical system, the aperture for beam shaping is arranged to coincide with the image side focal plane to perform the beam shaping on the laser beams at the same time.

As shown in FIG. 1A, the laser beams emitted from the light source unit 1 are given focusing tendency by a cylindrical lens 5 as a second optical system in the sub-scanning direction (a direction perpendicular to the drawing surface of FIG. 1A), are separated from one another in the sub-scanning direction and focused as a line image that is long in the main-scanning direction near the deflection reflection surface of a polygon mirror 7 as a deflecting unit. The polygon mirror 7 has four deflection reflection surfaces in the present embodiment.

Each laser beam reflected by the deflection reflection surface of the polygon mirror 7 focuses as a beam spot on the scanning surface 11 by the functions of lenses 8 and 10 as the third optical system. The lenses 8 and 10 can be made of glass or resin.

A plurality of beam spots that focuses on the scanning surface 11, which is images of the laser emission sources 1Aij of the VCSEL 1A by the first to third optical systems, separates in the main-scanning and sub-scanning directions, and performs multi-beam scanning on a plurality of scan lines simultaneously by rotating the polygon mirror 7 at a constant velocity.

The third optical system including the lenses 8 and 10 function as a so-called "fθ lens" and has a function to equalize the speed of displacement of the beam spot of each laser beam that is deflected at a constant angular velocity on the scanning surface 11 accompanied with the constant velocity rotation of the polygon mirror 7.

Moreover, the third optical system makes the position of the deflection reflection surface of the polygon mirror 7 and the position of the scanning surface 11 be in a conjugate relationship with respect to the sub-scanning direction, and because the above-mentioned line image long in the main-scanning direction becomes an object point with respect to the sub-scanning direction, the optical surface tangle of the polygon mirror 7 is corrected. In the present embodiment, the lenses 8 and 10 are both made of resin.

The scanning surface 11 shown in FIG. 1A is specifically a photosensitive surface of a photosensitive element.

Figure 2:
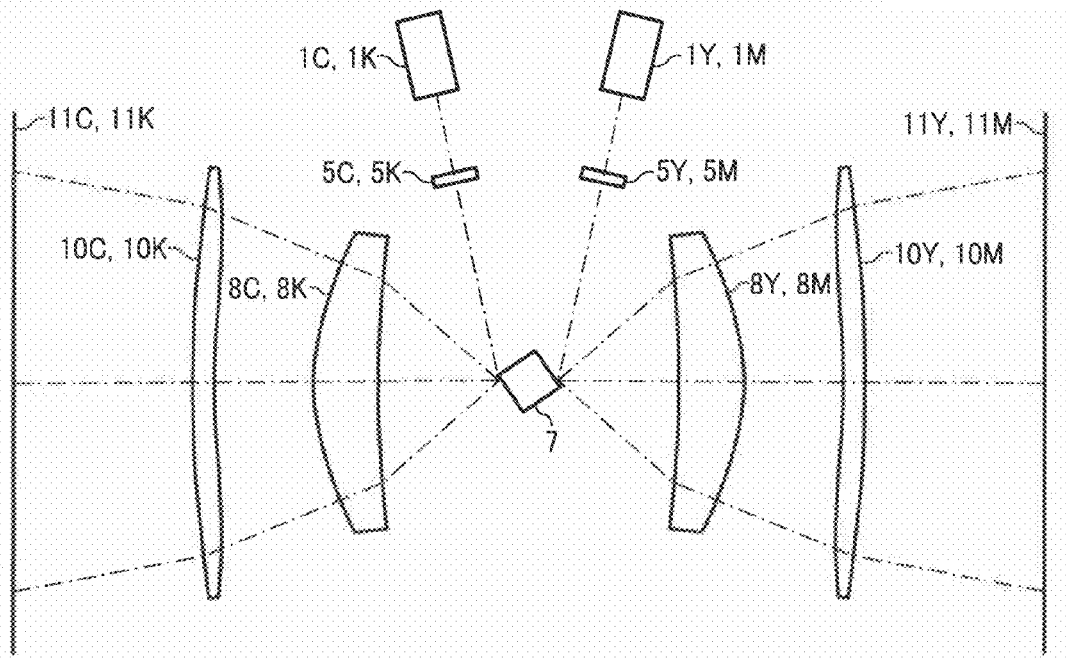
FIG. 2 is a plan view for explaining an example of an optical arrangement of a tandem-type optical scanning device as an example according to another embodiment of the present invention.

FIG. 2 is a plan view illustrating an optical system of a tandem-type optical scanning device as an example as seen from the sub-scanning direction, that is, from the rotation axis direction of the polygon mirror 7. The tandem-type optical scanning device is configured by combining the optical scanning devices having a configuration shown in FIG. 1A. For the simplicity of illustration, a mirror for deflecting the light path on the light path from the polygon mirror 7 to each scanning surface, which is an optical scanning position, is not shown in FIG. 2, and the light path is drawn as if it exists on a plane surface.

The optical scanning device scans four scanning surfaces 11Y, 11M, 11C, and 11K with light beams, respectively. Specifically, the four scanning surfaces 11Y, 11M, 11C, and 11K are photosensitive surfaces of photoconductive photosensitive elements, and electrostatic latent images formed on these photosensitive elements are individually visualized using magenta, yellow, cyan, and black toners; a color image is formed by superimposing the obtained four toner images. Therefore, hereinafter, common letters or numerals are put for the scanning surfaces and the photosensitive elements.

As shown in FIG. 2, the optical scanning device includes light source units 1Y, 1M, 1C, and 1K. The light source units 1Y and 1M are arranged to overlap in the sub-scanning direction, which is perpendicular to the drawing surface of FIG. 2. Each laser emission source of the VCSEL in the light source unit 1M is intensity-modulated by an image signal corresponding to a magenta image, and each laser emission source of the VCSEL in the light source unit 1Y is intensity-modulated by an image signal corresponding to a yellow image.

Similarly, the light source units 1C and 1K are arranged to overlap in the sub-scanning direction, each laser emission source of the VCSEL in the light source unit 1C is intensity-modulated by an image signal corresponding to a cyan image, and each laser emission source of the VCSEL in the light source unit 1K is intensity-modulated by an image signal corresponding to a black image.

A laser beam, which is emitted from each laser emission source of the VCSEL in the light source units 1Y and 1M, passes through the quarter wavelength plate, is collimated into a parallel beam by the collimation function of the first optical system, is shaped by the aperture, and is emitted from these light source units with the light intensity of the laser beam thereof separated.

These laser beams are respectively focused in the sub-scanning direction by cylindrical lenses 5Y and 5M as the second optical system, and enter the polygon mirror 7. The cylindrical lenses 5Y and 5M are arranged to overlap in the sub-scanning direction.

A plurality of line images long in the main-scanning direction formed by the cylindrical lenses 5Y and 5M is focused near the deflection reflection surface of the polygon mirror 7 while being separated in the sub-scanning direction, and the laser beams deflected by the polygon mirror 7 pass respectively through lenses 8Y, 8M, 10Y, and 10M as the third optical system, and form beam spots separated in the sub-scanning direction on the scanning surfaces 11Y and 11M by a lens function thereof. The scanning surfaces 11Y and 11M are scanned using the multi-beam scan method.

Similarly, a laser beam, which is emitted from each laser emission source of the VCSEL in the light source units 1C and 1K, passes through the quarter wavelength plate, is collimated into a parallel beam by the collimation function of the first optical system, is shaped by the aperture, and is emitted from these light source units with the light intensity of the laser beam thereof separated.

These emitted laser beams are focused respectively in the sub-scanning direction by cylindrical lenses 5C and 5K as the second optical system and enter the polygon mirror 7 to be deflected, pass respectively through lenses 8C, 8K, 10C, and 10Y as the third optical system, and form beam spots separated in the sub-scanning direction on the scanning surfaces 11C and 11K by a lens function. The scanning surfaces 11C and 11K are scanned using the multi-beam scan method.

Figure 3:
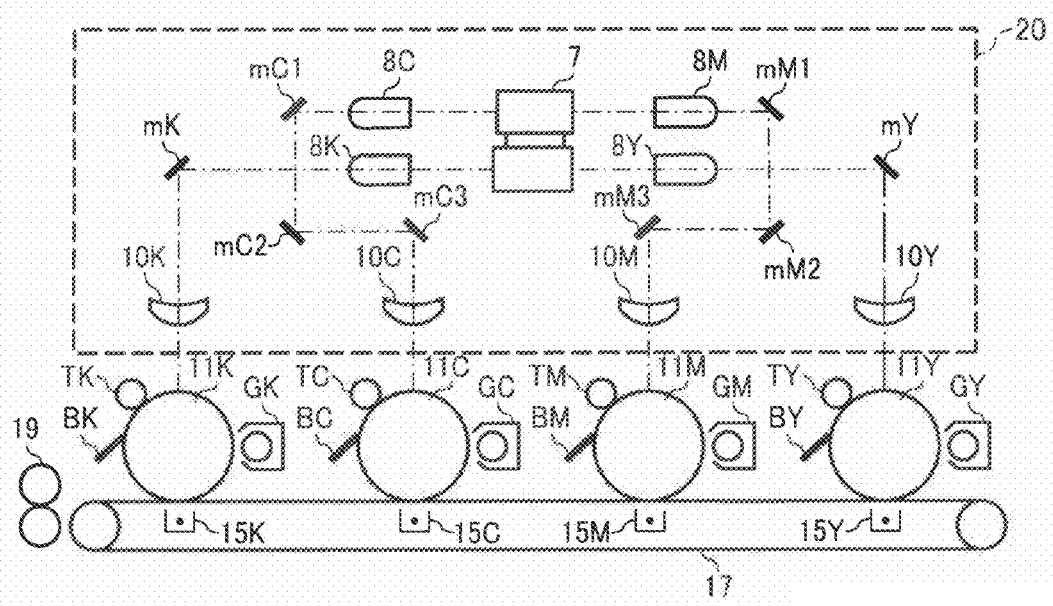
FIG. 3 is a schematic diagram of an image forming apparatus in which the optical scanning device shown in FIG. 2 is employed.

FIG. 3 is a schematic diagram illustrating a configuration of an image forming apparatus in which an optical scanning device 20 having a configuration same as that shown in FIG. 2 is employed.

As shown in FIG. 2, the polygon mirror 7 includes four deflection reflection surfaces and has a two-stage configuration as shown in FIG. 3. One of the light beams deflected by the deflection reflection surfaces on the upper stage is guided to the photosensitive element 11M along a light path deflected by light-path deflecting mirrors mM1, mM2, and mM3, and the other one of the light beams is guided to the photosensitive element 11C along a light path deflected by light-path deflecting mirrors mC1, mC2, and mC3.

One of the light beams deflected by the deflection reflection surfaces on the lower stage is guided to the photosensitive element 11Y along a light path deflected by light-path deflecting mirrors mY, and the other one of the light beams is guided to the photosensitive element 11K along a light path deflected by light-path deflecting mirrors mK.

Therefore, the four photosensitive elements 11Y, 11M, 11C, and 11K are scanned with the laser beams from the light source units 1Y, 1M, 1C, 1K, respectively, by the multi-beam scan method.

All the photosensitive elements 11Y to 11K are rotated clockwise at a constant velocity and uniformly charged by charging rollers TY, TM, TC, and TK as a charging unit. Then, the photosensitive elements 11Y to 11K are scanned with corresponding light beams, whereby electrostatic latent images (negative latent images) corresponding to color images of yellow, magenta, cyan, and black are written on the corresponding photosensitive elements 11Y to 11K.

The latent images are reversal-developed by respective developing units GY, GM, GC, and GK, and a yellow toner image, a magenta toner image, a cyan toner image, and a black toner image are formed on the photosensitive elements 11Y, 11M, 11C, and 11K, respectively.

These color toner images are transferred onto a printing sheet. Specifically, the printing sheet is conveyed by a conveying belt 17, and the yellow toner image is transferred from the photosensitive element 11Y onto the printing sheet by a transferring unit 15Y. In the similar manner, the magenta toner image, the cyan toner image, and the black toner image are transferred onto the printing sheet by transferring units 15M, 15C, and 15K, respectively, in series.

In this way, a color image is synthetically formed by superimposing the yellow toner image to black toner image on the printing sheet. The color image is fixed on the printing sheet by a fixing unit 19. Alternatively, it is possible that the color toner images formed on the respective photosensitive elements are superimposed on an intermediate transcription belt to form a color image thereon and transfer and fix the color image onto the printing sheet.

In FIG. 3, although the lenses 8Y and 8M into which the light beams deflected to the right side of the polygon mirror 7 enter are depicted separately, the lenses 8Y and 8M can be unified by overlaying them with each other in two stages. The same is true on the lenses 8C and 8Y into which the light beams deflected to the left side of the polygon mirror 7 enter in FIG. 3.

Each of the light source units 1Y, 1M, 1C, and 1K explained with reference to FIG. 2 is the same as the light source unit 1 shown in FIG. 1 in configuration. Therefore, hereinafter, the configuration and function thereof are explained by making the light source unit 1 as an example.

Figure 4:
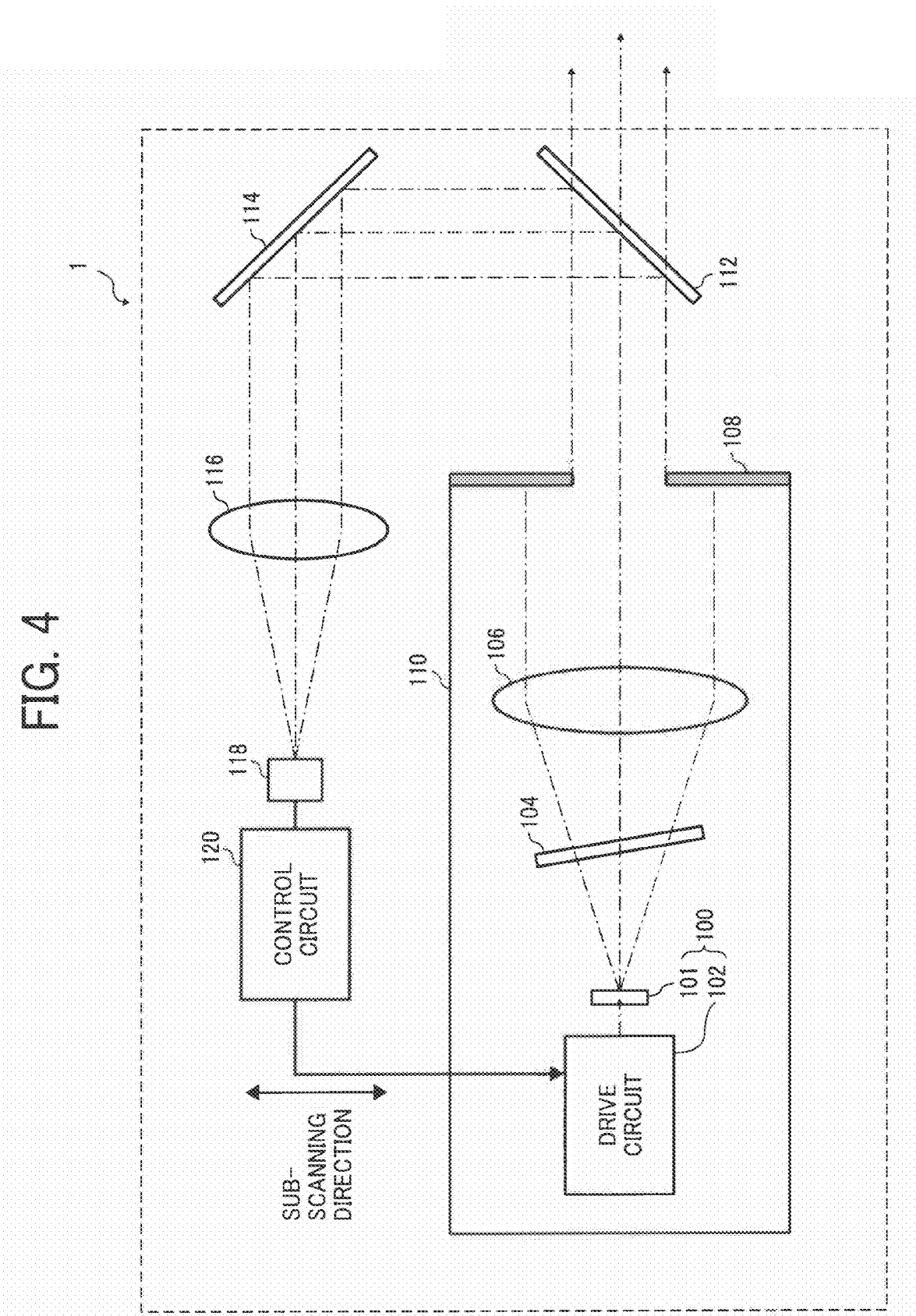
FIG. 4 is a schematic diagram of the light source unit.

FIG. 4 is a schematic diagram of the light source unit 1. The light source unit 1 includes a VCSEL 100. The VCSEL 100 includes a light emitting unit 101 and a drive circuit 102. The light source unit 1 further includes a quarter wavelength plate 104, a coupling lens 106 as the first optical system, an aperture 108, and a casing 110.

The VCSEL 100, the quarter wavelength plate 104, the coupling lens 106, and the aperture 108 are incorporated in respective predetermined positions in the casing 110 to be a unit.

With such configuration, when incorporating the components, it is possible to perform the adjustment to absorb the surface accuracy error of the quarter wavelength plate 104. Moreover, by holding the quarter wavelength plate 104 inside the unit in an integrated manner, the temporal change of the arrangement state of the quarter wavelength plate 104 can be made small, thereby enabling to suppress fluctuation in optical property of the quarter wavelength plate 104.

In the present embodiment, although the laser beam is collimated into a parallel light beam using one coupling lens, it is needless to say that a coupling lens having a collimation function can be configured using a plurality of lenses.

As shown in FIG. 4, the light source unit 1 includes a half mirror 112, a mirror 114, a condensing lens 116, and a light-receiving unit 118.

In the VCSEL 100, the laser emission sources 1Aij are arrayed on the light emitting surface of the light emitting unit 101 as shown in FIG. 1B, and the drive circuit 102 individually blinks the laser emission sources 1Aij in accordance with applied image signals.

As described above, a plurality of laser beams is emitted from the light emitting surface of the light emitting unit 101 as divergent light beams for multi-beam scanning. In FIG. 4, for simplifying the drawing, only a light beam of which the main light beam coincides with the optical axis of the coupling lens 106 is shown.

A plurality of emitted laser beams enters the quarter wavelength plate 104 while diverging.

The quarter wavelength plate 104 has a function of a quarter wavelength plate by means of double refraction on one surface of a parallel plate glass, and is arranged so that the optical axis thereof is tilted 45 degrees or −45 degrees with respect to the main-scanning direction that is perpendicular to the drawing surface of FIG. 4.

Moreover, as shown in FIG. 4, the quarter wavelength plate 104 is arranged to tilt in the sub-scanning direction with respect to the optical axis of the coupling lens 106 by rotating around the axis parallel to the main-scanning direction that is perpendicular to the drawing surface, so that it is suppressed that the laser beam reflected by the quarter wavelength plate 104 returns to the light emitting surface of the light emitting unit 101, enters the active layer, and thus changes the light intensity or affects the modulation.

As described above, the laser beams that has passed through the quarter wavelength plate 104 become a state in which the P polarization component and the S polarization component exist mixed at 1:1, and by the collimation function of the coupling lens 106, each laser beam is made into a parallel light beam.

The main light beams of the parallel light beams intersect with the optical axis of the coupling lens 106 at the position of the image side focal plane position. The aperture 108 coincides with the position of the image side focal plane position, and the center of an opening thereof is arranged to coincide with the axis of the coupling lens 106.

Therefore, the laser beams pass through a single opening of the aperture 108 to be shaped. The opening of the aperture 108 has a rectangular shape long in the main-scanning direction, and the cross-sectional shape of the laser beam after passing through the aperture 108 becomes a rectangular shape long in the main-scanning direction.

When the quarter wavelength plate 104 is arranged to tilt with respect to the optical axis of the coupling lens 106 as described above, aberration occurs.

The quarter wavelength plate 104 is arranged to tilt with respect to the optical axis of the coupling lens 106 in the main-scanning direction or the sub-scanning direction.

In FIG. 4, if the quarter wavelength plate 104 is tilted in the main-scanning direction, because the opening is long in the main-scanning direction, aberration at both edges of the opening in the main-scanning direction becomes large.

On the other hand, if the quarter wavelength plate 104 is tilted in the sub-scanning direction, because the width of the opening in the sub-scanning direction is small, aberration becomes small, thereby enabling to perform multi-beam scanning more appropriately.

The laser beams after being shaped by the aperture 108 enter the half mirror 112, the most part, for example, 95% of the light intensity of each laser beam passes through the half mirror 112, and remaining 5% of the light intensity is separated for use in the light intensity adjustment.

The laser beams of which light intensity is separated by the half mirror 112 are reflected by the mirror 114 and received by the light-receiving unit 118 after focused by the condensing lens 116.

In other words, the laser beams form an array of images of a plurality of the laser emission sources in the light emitting surface of the light emitting unit 101 on the light-receiving surface of the light-receiving unit 118.

The light-receiving unit 118 detects the light intensity of each focused laser beam, detects the emission light intensity of the laser emission source corresponding to each laser beam, and outputs the result thereof to a control circuit 120. The light-receiving unit 118 can be configured, for example, with a charge-coupled device (CCD) area sensor.

In short, the half mirror 112, the mirror 114, the condensing lens 116, and the light-receiving unit 118 constitutes a light intensity detection unit that separates the light intensity of a plurality of laser beams and detects the separated beams as light intensity detection light beams.

The control circuit 120 adjusts the light intensity of each laser emission source through the drive circuit 102 of the VCSEL 100 based on the light intensity data of each input laser emission source. That is, the control circuit 120 constitutes a light intensity adjustment unit that individually adjusts the emission light intensity of a plurality of laser emission sources in a VCSEL based on the result of detection by the light intensity detection unit.

Because a plurality of laser beams that has passed through the quarter wavelength plate 104 becomes a state in which the P polarization component and the S polarization component exist mixed at 1:1, it is possible to appropriately perform a light intensity adjustment.

Therefore, if the optical scanning device as shown in FIG. 1A or FIG. 2 is configured to include the light source unit 1 as shown in FIG. 4, and the image forming apparatus as shown in FIG. 3 is configured to include the optical scanning device including the light source unit 1, the adjustment of the light intensity is performed appropriately, thereby enabling to form an image with less density unevenness by appropriate multi-beam scanning.

The optical scanning device, configured as shown in FIG. 1 to include the light source unit 1 explained with reference to FIG. 4, is a multi-beam type optical scanning device. The optical scanning device includes the VCSEL 100, the first optical system 106, the polygon mirror 7, the second optical system 5, the third optical system 8 and 10, the parallel-plate-like quarter wavelength plate 104, the light-intensity detecting unit, and the light-intensity adjusting unit 120. The VCSEL 100 is configured by arraying a plurality of laser emission sources. The first optical system 106 converts the form of the linearly polarized light beam emitted from each laser emission source 1Aij of the VCSEL 100 into a form appropriate for the subsequent optical systems. The polygon mirror 7 includes deflection reflection surfaces and deflects a plurality of laser beams of which light beam forms is converted by the first optical system by reflecting them by the deflection reflection surfaces. The second optical system 5 focuses the laser beams of which light beam forms are converted by the first optical system near the deflection reflection surfaces as line images that are separated from one another in the sub-scanning direction and long in the main-scanning direction. The third optical system 8 and 10 focuses the deflection laser beams deflected by the deflection unit 7 on the scanning surface 11 as a plurality of light spots that is separated from one another in the sub-scanning direction. The parallel-plate-like quarter wavelength plate 104 is arranged between the VCSEL 100 and the first optical system 106. The light-intensity detecting unit includes the half mirror 112, the mirror 114, the condensing lens 116, and the light-receiving unit 118, and separates the light intensity of a plurality of laser beams of which beam forms is converted by the first optical system and detects the separated laser beams as light intensity detection light beams. The light-intensity adjusting unit 120 adjusts the light intensity of each of a plurality of laser emission sources in the VCSEL 100 based on the results of detection by the light-intensity detecting unit. Moreover, the arrangement state of the quarter wavelength plate 104 is determined so that the optical axis of the quarter wavelength plate 104 is tilted ±45 degrees with respect to the main-scanning direction around the optical axis of the first optical system 106.

Furthermore, the quarter wavelength plate 104 is arranged to tilt with respect to the plane perpendicular to the optical axis of the first optical system 106, so that it is suppressed that the laser beam reflected by the quarter wavelength plate 104 returns to the light emitting surface of the light emitting unit 101, enters the active layer, and thus changes the light intensity or affects the modulation.

Moreover, the opening of the aperture 108 has a rectangular shape long in the main-scanning direction, the opening diameter satisfies Ay>Az, and the quarter wavelength plate 104 is tilted in the sub-scanning direction.

Furthermore, if the optical scanning device shown in FIG. 2 employs the light source unit 1 shown in FIG. 4, the optical scanning device serves as a tandem-type optical scanning device that includes a plurality of sets of optical scanning devices shown in FIG. 1, is configured so that the main scan areas of each set of the optical scanning devices become an array overlapped in parallel with each other in the sub-scanning direction, and shares the polygon mirror 7 by the plurality of sets of optical scanning devices.

Because a plurality of laser beams emitted from the unit in which the VCSEL 100, the quarter wavelength plate 104, the coupling lens 106, and the aperture 108 are mounted integrally in the casing 110 as shown in FIG. 4 has the P polarization component and the S polarization component at 1:1, the shading correction is performed appropriately.

Therefore, when the light intensity adjustment is performed using another unit, or when the amount adjustment is nor required, an optical scanning device and an image forming apparatus can be configured with only the above unit as the light source unit, enabling to perform multi-beam scanning and image formation while appropriately performing a shading correction.

The optical scanning device of the present invention is an optical scanning device employing a multi-beam scanning method, and includes a VCSEL, first to third optical systems, a deflecting unit, a quarter wavelength plate, a light-intensity detecting unit, and a light-intensity adjusting unit.

The VCSEL includes a plurality of laser emission sources. The laser emission sources, each of which has an emission structure to emit laser beam, are arranged one dimensionally or two dimensionally on the same surface of the VCSEL. The emitted laser beam is of course in a linearly polarized state.

The arrangement state of the laser emission sources and the number of the laser emission sources are determined depending on the interval and the number of scan lines that are simultaneously subjected to optical scanning by means of the multi-beam scanning method.

The first optical system converts the form of the linearly-polarized laser beam emitted from each laser source of the VCSEL into a form appropriate for the subsequent optical systems. The laser beam form appropriate for the subsequent optical systems is, for example, a parallel light beam or a weakly divergent or weakly convergent light beam. Therefore, the first optical system can be a collimator lens or a lens having a positive refracting power.

The deflecting unit, which includes a deflection reflection surface, is a unit that deflects a plurality of the laser beams of which forms are converted by the first optical system by reflecting them by the deflection reflection surface, and can be, for example, a polygon mirror, a rotating single surface mirror, or a rotating two-surface mirror.

The second optical system is an optical system having a function to focus a plurality of the laser beams of which forms are converted by the first optical system as line images that are long in the main-scanning direction and are separated from one another in the sub-scanning direction near the deflection reflection surface, and can be, for example, a cylindrical lens or a cylindrical mirror having a positive power in the sub-scanning direction.

The third optical system is an optical system having a function to focus a plurality of the deflection laser beams deflected by the deflecting unit as a plurality of light spots that is separated from one another in the sub-scanning direction on the scanning surface, and is preferably an fθ lens having an fθ function.

The optical scanning by the multi-beam scanning method is performed by means of the light spots.

Because the laser beams are focused as the line images that are long in the main-scanning direction near the deflection reflection surface by the function of the second optical system, the third optical system that focuses the laser beams deflected by the deflecting unit as the light spots on the scanning surface is an anamorphic optical system with different powers between the main-scanning direction and the sub-scanning direction. Both the second optical system and the third optical system have a function to correct an optical surface tangle error by cooperating with each other.

The light-intensity detecting unit separates the light intensity of the laser beams of which forms are converted by the first optical system, and detects the separated laser beam as a light beam for detecting the light intensity.

In other words, the light-intensity detecting unit includes a separation optical device that separates a part of each of the laser beams as a light beam for detecting the light intensity, a sensor (light-receiving element) that receives the separated light beam for detecting the light intensity, and a light guiding unit that guides the light beam for detecting light intensity to the sensor.

The sensor can receive each of the light beams individually.

The light guiding unit can include a mirror that deflects a guide optical path; however, preferably includes a lens that focuses each light beam for detecting light intensity individually on the sensor.

The light-intensity adjusting unit is a unit for adjusting the emission intensity of the laser emission sources in the VCSEL individually based on the results of detection by the light-intensity detecting unit.

As the light guiding unit, the sensor, and the light-intensity adjusting unit, publicly known ones such as those described in Japanese Patent Application Laid-open No. 2005-156933 can be appropriately utilized.

The quarter wavelength plate is arranged between the VCSEL and the first optical system and has a parallel flat plate shape.

In addition, the arrangement state of the quarter wavelength plate is determined so that the optical axis thereof is tilted ±45 degrees with respect to the main scanning direction around the axis of the first optical system.

Because the quarter wavelength plate is arranged between the VCSEL and the first optical system, any of the laser beams emitted from the VCSEL enters the quarter wavelength plate in a divergent state.

The quarter wavelength plate has a birefringence property, and gives a phase difference: 90 degrees with respect to a light (laser beam) in a linearly polarized state perpendicular to the quarter wavelength plate.

If the quarter wavelength plate is arranged as described above, it is possible to effectively reduce or prevent that the laser beam emitted from the VCSEL and reflected by the quarter wavelength plate returns to the laser emission source of the VCSEL and affects the light emission of the VCSEL.

To tilt the quarter wavelength plate in the main-scanning (sub-scanning) direction with respect to the surface perpendicular to the axis of the first optical system means to rotate the quarter wavelength plate around an axis parallel to the sub-scanning (main-scanning) direction to tilt it.

In addition, in any of the described-above optical scanning devices, it is preferable that at least the VCSEL, the quarter wavelength plate, and the first optical system, and optionally an aperture, the light-intensity detecting unit, and the light-intensity adjusting unit are mounted integrally in a same casing or a housing by adjusting the mutual positional relationships to be one unit.

The above-described plurality of sets of the optical scanning devices each includes the VCSEL, the first to third optical systems, the light-intensity detecting unit, the light-intensity adjusting unit, and the quarter wavelength plate; however, the polygon mirror is shared by the optical scanning devices.

As described above, in the optical scanning device, the quarter wavelength plate is arranged between the VCSEL and the first optical system, and the laser beams enter the quarter wavelength plate in a divergent state.

Therefore, transmission length that the laser beam passes through the thickness with which a phase difference is given of the quarter wavelength plate differs depending on the incidence angle onto the quarter wavelength plate for each laser beam, and the polarization state of the laser beam that has passed through the quarter wavelength plate becomes a mixed state of a circularly polarized state, a elliptically polarized state, and further in some situations, a linearly polarized state.

As described above, because the arrangement state of the quarter wavelength plate is determined so that the optical axis thereof is tilted ±45 degrees with respect to the main scanning direction around the axis of the first optical system, regardless of the polarization direction of the incident laser beam, for example, even if the polarization direction varies in the range of ±90°, for the polarization components of the laser beam that has passed through the quarter wavelength plate, the ratio of the P polarization component and the S polarization component becomes about 1:1 in any polarization state of a circularly polarized state, an elliptically polarized state, and a linearly polarized state.

In other words, because the P polarization component and the S polarization component of the laser beams that have passed through the quarter wavelength plate become substantially equal, a part of the light intensity of these laser beams is separated to detect the light intensity and the detected light intensity is controlled to be a predetermined amount, so that the light intensity can be controlled appropriately and appropriate shading correction can be realized.

According to an aspect of the present invention, excellent images can be formed by optical scanning after shading correction is appropriately performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that employs a multi-beam scanning method, the optical scanning device comprising:
    a surface emitting laser light source that includes a plurality of laser emission sources;
    a first optical system that converts a form of laser beams in a linearly polarized state that are emitted from the plurality of laser emission sources into a form appropriate for a subsequent optical system;
    a deflection unit that includes a deflection reflection surface and deflects the laser beams of which form is converted by the first optical system by reflecting the laser beams by the deflection reflection surface;
    a second optical system that focuses the laser beams of which form is converted by the first optical system as line images that are separated from one another in a sub-scanning direction and are long in a main-scanning direction near the deflection reflection surface;
    a third optical system that focuses the laser beams deflected by the deflection unit on a scanning surface as a plurality of light spots that are separated from one another in the sub-scanning direction;
    a parallel-plate-like quarter wavelength plate that is arranged between the surface emitting laser light source and the first optical system; and
    an aperture that performs beam-shaping on the laser light beams of which form is converted by the first optical system, wherein
    the quarter wavelength plate is arranged to be tilted with respect to a plane that is perpendicular to an optical axis of the first optical system; and
    the quarter wavelength plate is arranged to tilt in the sub-scanning direction with respect to the plane when $Ay > Az$ is satisfied and in the main-scanning direction with respect to the plane when $Ay < Az$ is satisfied, where $Ay$ is an opening size of the aperture in the main-scanning direction and Az is an opening size of the aperture in the sub-scanning direction.

2. A tandem-type optical scanning device comprising: a plurality of sets of the optical scanning device according to claim 1, wherein main scan areas of each of the plurality of sets of the optical scanning device are arranged to be overlapped in parallel with each other in the sub-scanning direction.

3. The tandem-type optical scanning device according to claim 2, wherein the plurality of sets of the optical scanning device shares the deflection unit.

4. The optical scanning device according to claim 1, further comprising:
   a light-intensity detecting unit that separates light intensity of the laser beams of which form is converted by the first optical system and detects separated laser beams as light-intensity detection light beams.

5. The optical scanning device according to claim 4, further comprising:
   a light-intensity adjusting unit that adjusts emission intensity of the laser emission sources individually based on a result of detection by the light-intensity detecting unit.

6. The optical scanning device according to claim 4, wherein the quarter wavelength plate is arranged so that an optical axis of the quarter wavelength plate is tilted ±45 degrees with respect to the main-scanning direction around the optical axis of the first optical system.

7. An image forming apparatus that forms an electrostatic latent image by writing image data on a photosensitive element by optical scanning and visualizes the electrostatic latent image as a toner image, the image forming apparatus comprising an optical scanning device that employs a multibeam scanning method and includes a surface emitting laser light source that includes a plurality of laser emission sources;

a first optical system that converts a form of laser beams in a linearly polarized state that are emitted from the plurality of laser emission sources into a form appropriate for a subsequent optical system;

a deflection unit that includes a deflection reflection surface and deflects the laser beams of which form is converted by the first optical system by reflecting the laser beams by the deflection reflection surface;

a second optical system that focuses the laser beams of which form is converted by the first optical system as line images that are separated from one another in a sub-scanning direction and are long in a main-scanning direction near the deflection reflection surface;

a third optical system that focuses the laser beams deflected by the deflection unit on a scanning surface as a plurality of light spots that are separated from one another in the sub-scanning direction;

a parallel-plate-like quarter wavelength plate that is arranged between the surface emitting laser light source and the first optical system; and an aperture that performs beam-shaping on the laser light beams of which form is converted by the first optical system, wherein the quarter wavelength plate is arranged to be tilted with respect to a plane that is perpendicular to an optical axis of the first optical system; and the quarter wavelength plate is arranged to tilt in the sub-scanning direction with respect to the plane when Ay>Az is satisfied and in the main-scanning direction with respect to the plane when Ay<Az is satisfied, where Ay is an opening size of the aperture in the main-scanning direction and Az is an opening size of the aperture in the sub-scanning direction.

* * * * *